US011126860B2

(12) United States Patent
Ito et al.

(10) Patent No.: US 11,126,860 B2
(45) Date of Patent: Sep. 21, 2021

(54) ABNORMALITY DETECTION DEVICE, ABNORMALITY DETECTION METHOD, AND STORAGE MEDIUM

(71) Applicant: ADACOTECH INCORPORATED, Tokyo (JP)

(72) Inventors: Keiichi Ito, Ibaraki (JP); Takahide Ibe, Saitama (JP); Nobuyuki Otsu, Ibaraki (JP)

(73) Assignee: ADACOTECH INCORPORATED, Tokyo (JP)

(*) Notice: Subject to any disclaimer, the term of this patent is extended or adjusted under 35 U.S.C. 154(b) by 0 days.

(21) Appl. No.: 16/649,104

(22) PCT Filed: Aug. 1, 2018

(86) PCT No.: PCT/JP2018/028784
§ 371 (c)(1),
(2) Date: Mar. 19, 2020

(87) PCT Pub. No.: WO2019/058775
PCT Pub. Date: Mar. 28, 2019

(65) Prior Publication Data
US 2020/0293789 A1    Sep. 17, 2020

(30) Foreign Application Priority Data

Sep. 21, 2017  (JP) .............................. JP2017-180817

(51) Int. Cl.
*G06T 7/20*    (2017.01)
*G08B 13/194*  (2006.01)
(Continued)

(52) U.S. Cl.
CPC ..... *G06K 9/00771* (2013.01); *G06K 9/00335* (2013.01); *G06K 9/6284* (2013.01)

(58) Field of Classification Search
CPC .......... G06K 9/00771; G06K 9/00785; G06K 9/00335; G06K 9/00624; G06K 9/6284;
(Continued)

(56) References Cited

U.S. PATENT DOCUMENTS

2006/0115159 A1* 6/2006 Rexhepi .................... G06T 7/12
382/199
2008/0123975 A1* 5/2008 Otsu ................... G08B 13/1961
382/236
(Continued)

FOREIGN PATENT DOCUMENTS

JP    2007219865 A    8/2007
JP    4368767 B2      9/2009

OTHER PUBLICATIONS

International Search Report dated Oct. 16, 2018 (and English translation thereof) issued in International Application No. PCT/JP2018/028784.
(Continued)

*Primary Examiner* — Thai Q Tran
*Assistant Examiner* — Jose M Mesa
(74) *Attorney, Agent, or Firm* — Holtz, Holtz & Volek PC (57) ABSTRACT

An abnormality detection device calculates high-dimensional feature values from real world data; projects, by using a matrix generated from real world data collected for learning so as to project the feature values onto an abnormality discriminant space, feature values calculated from real world data which is input for inspection onto an abnormality discriminant space, the abnormality discriminant space being used for determining presence or absence of an abnormality; judges the presence or absence of an abnormality from a distribution in the abnormality discriminant space; identifies, if an abnormality is found and if the abnormality is a known abnormality, the content of the abnormality from a trend of a distribution in the abnormality
(Continued)

discriminant space and presenting the content of the abnormality; and visually displays a distribution in the abnormality discriminant space as a detection result of an abnormality.

5 Claims, 9 Drawing Sheets

(51) Int. Cl.
    *G08B 13/196* (2006.01)
    *G01D 5/39* (2006.01)
    *G06T 7/00* (2017.01)
    *H04N 7/18* (2006.01)
    *H04N 5/225* (2006.01)
    *G06K 9/00* (2006.01)
    *G06K 9/62* (2006.01)

(58) Field of Classification Search
    CPC ........... G06T 7/20; G06T 7/00; G08B 13/194; G08B 13/196; H04N 5/144; H04N 7/18; H04N 5/225; G01D 5/39
    See application file for complete search history.

(56) References Cited

U.S. PATENT DOCUMENTS

2012/0294511 A1* 11/2012 Datta .............. G08B 13/19606
                                                     382/155
2019/0226943 A1*  7/2019 Hayashi .............. G01M 13/045

OTHER PUBLICATIONS

Written Opinion of the International Search Authority dated Oct. 16, 2018 issued in International Application No. PCT/JP2018/028784.
Kobayashi, et al., "A Three-Way Auto-Correlation Based Approach to Human Identification by Gait", Proc. IEEE Workshop on Visual Surveillance (VS), pp. 185-192, 2006.
Extended European Search Report (EESR) dated Sep. 28, 2020, issued in European Application No. 18859789.2.
Hubert M et al: "ROBPCA: A New Approach to Robust Principal Component Analysis", Technometrics, ASQC., Alexandria, VA, US, vol. 47, No. 1, Feb. 1, 2005 (Feb. 1, 2005), pp. 64-79, XP002367341, ISSN: 0040-1706, DOI: 10.1198/004017004000000563.
Xingyan Bin et al: "Abnormal Subspace Sparse PCA for Anomaly Detection and Interpretation", arxiv.org, Cornell University Library,, 201 Olin Library Cornell University Ithaca, NY 14853, May 16, 2016 (May 16, 2016), XP080701292.

* cited by examiner

ABNORMALITY DETECTION DEVICE, ABNORMALITY DETECTION METHOD, AND STORAGE MEDIUM

TECHNICAL FIELD

The present invention relates to an abnormality detection device, an abnormality detection method, and storage medium, and more particularly, to an abnormality detection device and an abnormality detection method for displaying detection results as intuitively comprehensible visual information.

BACKGROUND ART

Hitherto, automating and labor-saving of detecting abnormalities from data, such as image data and sound data, is demanded in various fields, such as camera monitoring, various product inspection (visual inspection), status monitoring (sensor information and sound) in plants and systems. The need for abnormality detection is expected to be increasing more and more in accordance with the widespread use of cameras and sensors. As measures to implement automating and labor-saving of abnormality detection, the methods disclosed in the following PTL 1 and PTL 2, for example, are proposed.

The abnormality detection methods disclosed in PTL 1 and PTL 2 utilize a technique called the cubic higher-order local auto-correlation feature extracting method disclosed in NPL 1. By using this method, feature values are calculated, and then, the degree of abnormal behavior of a person in an image is calculated.

CITATION LIST

Patent Literature

PTL 1: Japanese Patent No. 4368767
PTL 2: Japanese Unexamined Patent Application Publication No. 2007-219865
Non Patent Literature NPL 1: A Three-Way Auto-Correlation Based Approach to Human Identification by Gait, Proc. IEEE Workshop on Visual Surveillance (VS), pp. 185-192, 2006.

DISCLOSURE OF THE INVENTION

Problems to be Solved by the Invention

The following problems are found in the above-described related art. In the related art disclosed in PTL 1, An abnormality is defined as "something different from normality data which is prepared during learning". A subspace of feature values calculated from normality data is created in learning, and the degree of deviation (abnormality value) from the subspace is subjected to threshold processing, thereby making normality/abnormality decision. The content of abnormality varies depending on the type of abnormality. In the related art, however, pieces of data which are not normal are collectively determined as the single type of abnormality by using a scalar quantity, that is, the abnormality value, and different types of abnormalities are not distinguished from each other.

Video image monitoring on the highway is taken as an example. Although it is possible to make normality/abnormality decision based on the magnitude of the abnormality value, it is not possible to determine whether the detected abnormality is "driving the wrong way" or "someone entering the highway". Additionally, since an abnormality is recognized as "something different from normality data which is prepared during learning", a very rare case, which is a normality case, deviating from learning data, such as a bird flying through in front of the camera, is also detected as an abnormality.

PTL 2 discusses the following improvements made by adding also abnormality samples to learning samples. "The false reporting rate (a normality sample mistaken for an abnormality) and the non-detection rate (an abnormality sample mistaken for normality) are calculated, and the appropriate threshold is determined in such a manner that the false reporting rate and the non-detection rate become the same, for example". "Instead of using two classes, which are a normality class and an abnormality class, the number of classes is expanded to three or more including a light degree of abnormality in addition to the two classes". "The contribution rate (dimensions) is determined so as to decrease the false reporting rate and the non-detection rate". Although these improvements can reduce the burden on the operator concerning the setting of a threshold for the abnormality value and the levels of the threshold, they do not solve the above-described problems in the first place.

NPL 1 proposes the so-called pattern recognition method. Prepared items of data are divided into plural categories. Then, the distribution trend of feature values is formed into a model by learning. It is then identified to which category test data belongs.

This method may be used to solve the above-described problems. However, the space for identifying test data is typically a high-dimensional space, such as a four- or higher-dimensional space, and it is thus difficult to visually and intuitively comprehend the identifying results. Additionally, NPL 1 does not discuss the issue concerning the normality/abnormality decision.

The problems of the related art can be summarized into the following two points. (1) Abnormalities are largely divided into two types "known abnormalities that an operator expected to occur" and "unknown abnormalities that an operator did not expect to occur". PTL 1 and PTL 2, however, which make normality/abnormality judgment based on the magnitude of the degree of abnormality, are unable to distinguish between known abnormalities and unknown abnormalities (and the types of known abnormalities) from each other.

(2) In the method disclosed in NPL 1, too, it is difficult to present the identifying results in the high-dimensional feature space as information that is intuitively comprehensible to an operator. NPL 1 does not discuss the issue concerning the normality/abnormality decision nor the use of a user interface.

It is an object of the present invention to solve the above-described problems of the related art and to implement the following functions by using feature values calculated from real world data. Normality/abnormality decision is made, and if an abnormality is found, it is also decided whether this abnormality is a known abnormality or an unknown abnormality. In the case of a known abnormality, the content of abnormality is determined. Instead of the known discriminant analysis technique using two classes, which are a normality class and an abnormality class, a new discriminant technique (categorical filter) is employed to detect an abnormality and identify the content of the abnormality in the above-described function. A high-dimensional feature-value space is projected onto a low-dimensional (two- or three-dimensional) abnormality discriminant space (abnormality discriminant plane if it is a two-dimensional space) for abnormality decision, and detection results are displayed on the screen as information that is intuitively comprehensible to an operator. The detection results are fed back to judging processing if necessary.

Means for Solving the Problems

An abnormality detection device according to the present invention includes: feature-value calculating means for calculating high-dimensional feature values from real world data; matrix generating means for generating, from real world data collected for learning, a matrix for projecting feature values onto an abnormality discriminant space; projecting means for projecting, by using the matrix, feature values calculated from real world data which is input for inspection onto an abnormality discriminant space, the abnormality discriminant space being used for determining the presence or the absence of an abnormality; abnormality judging means for judging the presence or the absence of an abnormality from a distribution in the abnormality discriminant space; abnormality identifying means for identifying, if an abnormality is found and if the abnormality is a known abnormality, the content of the abnormality from a trend of a distribution in the abnormality discriminant space and presenting the content of the abnormality; and displaying means for visually displaying a distribution in the abnormality discriminant space so that a detection result is intuitively comprehended.

The above-described abnormality detection device further includes: learning update means for updating the matrix by executing learning processing based on the detection result displayed by the visually displaying means.

In the above-described abnormality detection device, the matrix generating means generates the matrix by using a categorical filter.

An abnormality detection method according to the present invention includes: a step of calculating high-dimensional feature values from real world data; a step of generating, from real world data collected for learning, a matrix for projecting feature values onto an abnormality discriminant space; a step of projecting, by using the matrix, feature values calculated from real world data which is input for inspection onto an abnormality discriminant space, the abnormality discriminant space being used for determining the presence or the absence of an abnormality; a step of judging the presence or the absence of an abnormality from a distribution in the abnormality discriminant space; a step of identifying, if an abnormality is found and if the abnormality is a known abnormality, the content of the abnormality from a trend of a distribution in the abnormality discriminant space and presenting the content of the abnormality; and a step of visually displaying a distribution in the abnormality discriminant space so that a detection result is intuitively comprehended.

Advantageous Effects of Invention

The abnormality detection device and the abnormality detection method according to the present invention achieve the following advantages.

(1) It is possible to intuitively identify the content of an abnormality from visualized information in the presented abnormality discriminant space. Because of this visualized information, even for a case which would be mistaken for an abnormality if the presence or the absence of an abnormality were decided simply from the magnitude of an abnormality value, an operator is able to intuitively comprehend the difference between a real abnormality and a false abnormality. This enables the operator to determine how to optimally handle an abnormality detected by the abnormality detection device. For example, in fault diagnosis for production machines in a factory, the efficient PDCA cycle is implemented based on the detection results, thereby enhancing the efficiency of machine maintenance.

(2) Even if false reporting frequently occurs at a certain timing, such as immediately after the abnormality detection device has started to operate, it is possible to readily change the threshold to an appropriate one based on visualized information.

PREFERRED MODE FOR CARRYING OUT THE INVENTION

Modes for carrying out this invention will be described below in detail with reference to the drawings through illustration of embodiments. In an abnormality detection device according to the present invention, as well as in the related art, one scalar quantity (linear dimension) is calculated to make normality/abnormality decision. Hereinafter, this quantity will be called the abnormality value. An abnormality discriminant space is generated by optimally projecting a regular feature space (high-dimensional) for identifying an abnormality. Then, as the distribution positions in this abnormality discriminant space, detection results are displayed in a low-dimensional (two- or three-dimensional) space and are visualized.

As the approach to creating the abnormality discriminant space (plane), two dimensions which most effectively contribute to detecting an abnormality in the feature space for calculating the abnormality value may be selected. In the known approach, pieces of information indicating different types of abnormalities, for example, in the feature space converge into the linear dimension (scalar quantity) representing the degree of deviation (abnormality value) from the normality. These degrees of deviation are merely categorized as two classes, which are a normality class and an abnormality class, as a result of executing threshold processing. Information concerning the different types (directions) of abnormalities is omitted. In this manner, the known approach is not effectively utilized.

In contrast, in the present invention, pieces of information indicating different types of abnormalities, which are omitted in the known approach, are also displayed at different positions on the two-dimensional abnormality discriminant plane. This enables an operator to intuitively comprehend and identify abnormalities.

Figure 7:
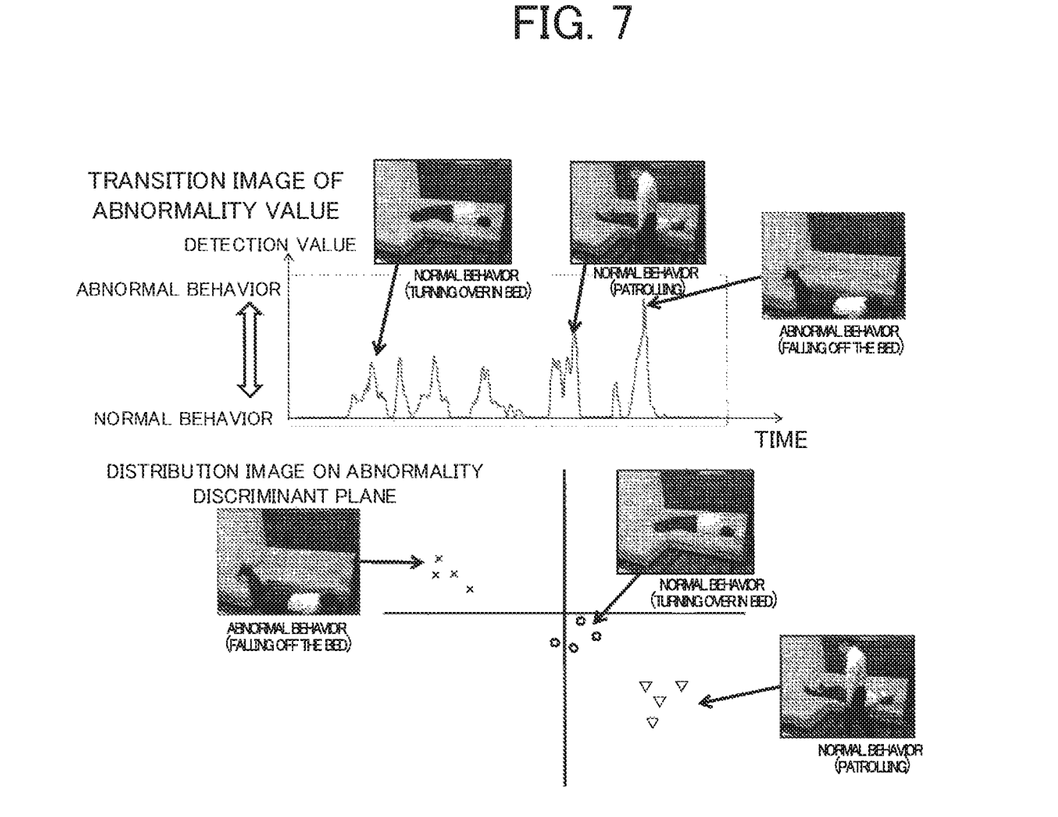
FIG. 7 is an explanatory view illustrating the relationship between the transition of an abnormality value and the distribution in an abnormality discriminant space in the present invention.

FIG. 7 is an explanatory view illustrating an example of a display screen of an abnormality discriminant space when video image analysis is conducted in the present invention. FIG. 7 illustrates the transition of the abnormality value and the distribution on the abnormality discriminant plane. The transition of the abnormality value and the abnormality discriminant plane shown in FIG. 7 are obtained when patients falling off the bed are detected with a monitor camera in a hospital or a nursing facility by way of example. Based on the transition of the abnormality value in the upper section of the drawing, the degree of deviation from the learned normal motion is quantified, and a patient falling off the bed can be detected as an abnormality. It is however impossible to distinguish between types of motions, such as turning over in bed, patrolling in the hospital or the facility, falling off the bed from each other, based on the transition of the abnormality value. Only using the abnormality value fail to obtain more detailed information, such as what types of incidents occurring around the bed.

In the present invention, as shown in the lower section of FIG. 7, the detection results are plotted on the abnormality discriminant plane, and based on the distribution trend (different positions in the drawing), turning over in bed (normal), patrolling in the hospital or the facility (normal), and falling off the bed (abnormal) can be distinguished from each other. Additionally, the operator is able to easily assess the validity of the decision results from the visualized information. For example, based on the plotting in the lower section of the drawing, the operator is able to understand that the abnormalities tend to be distributed in the second quadrant of the abnormality discriminant plane and to determine that the abnormalities distributed in the other quadrants may be false.

The distribution on the abnormality discriminant plane is presented to the operator in real time. To enable the operator to more accurately and intuitively comprehend the detection situation, when the distribution is presented, the following items of information (additional information) are added to the distribution information: (1) threshold setting information; (2) past detection-result history; and (3) label information regarding whether the operator has appended a normality label or an abnormality label to real world data.

Presenting such visual information makes it possible to intuitively comprehend the trend of the detection results. For example, as a result of presenting that the trend of the feature distribution deviates from the past detection history, the operator can identify that an unknown phenomenon which the operator had not expected may have occurred. The operator is able to select whether or not the additional information is displayed.

If abnormality examples are applicable to learning as known abnormalities, supervised learning is actively conducted to form a higher-precision abnormality discriminant plane. Especially when multiple modes (categories) of abnormalities are known, they are labeled with marks, such as an ellipse and a rectangle, at individual distribution regions (locations) on the abnormality discriminant plane, thereby making it possible to automatically identify them. Hereinafter, embodiments will be described.

First Embodiment

Figure 1:
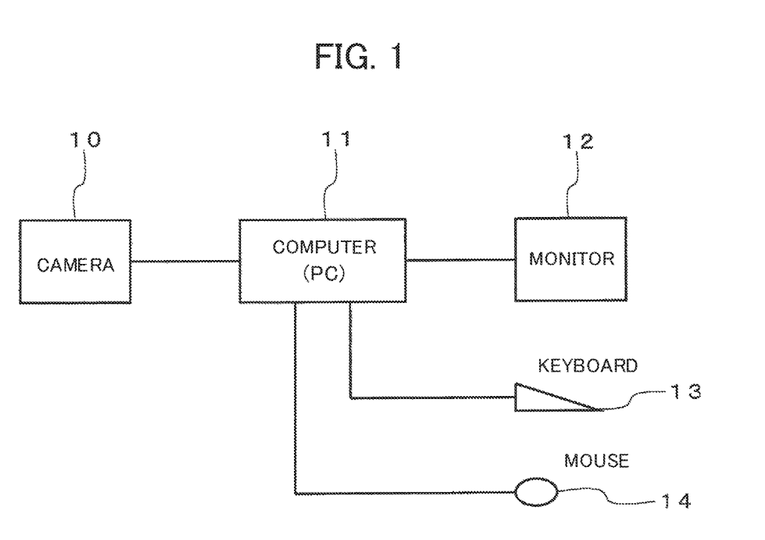
FIG. 1 is a block diagram illustrating the hardware configuration of an abnormality detection device according to the present invention.

FIG. 1 is a block diagram illustrating the hardware configuration of an abnormality detection device according to the present invention. In FIG. 1, a camera1 10 is a digital camera which captures an image of an object as a video image or a still image, for example. The camera 10 outputs captured digital image data to a computer 11. The computer 11 may be an existing personal computer (PC) including a general-purpose digital input/output interface circuit and an interface circuit for receiving an electric analog signal from a microphone, for example. The present invention is implemented by creating a program for executing processing, which will be discussed later, and installing the program into the existing computer 11, such as a personal computer.

A monitor 12 is an existing output unit of the computer 11 and is used for displaying analysis result information, such as an abnormality discriminant plane, to an operator. A keyboard 13 and a mouse 14 (may alternatively be a touchscreen and a trackball) are existing input devices used for the operator to perform an input operation. Based on the information output to the monitor, the operator performs an operation concerning how to display the visualized detection results, for example, by using the mouse 14 and the keyboard 13.

Examples of the operation are (1) selecting a connected device to be visualized if multiple data collecting devices are connected, and (2) enlarging and displaying part of the visualized distribution.

Figure 2:
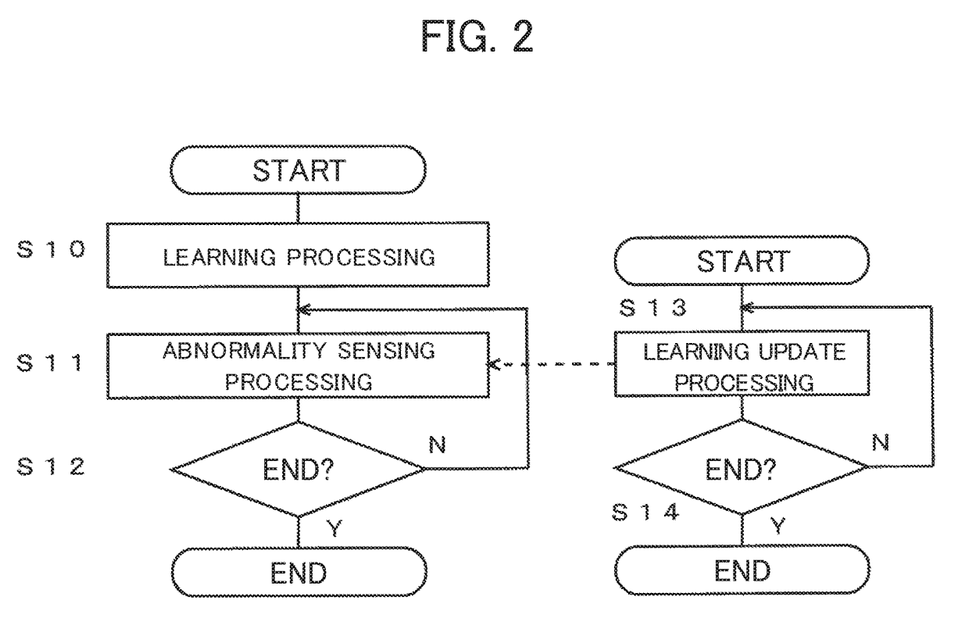
FIG. 2 shows flowcharts illustrating the content of abnormality detection processing using an abnormality detection method of the present invention.

FIG. 2 shows flowcharts illustrating the content of abnormality detection processing using the abnormality detection method of the present invention. Processing to be executed in the present invention is largely divided into learning processing, abnormality sensing processing, and learning update processing. In learning processing in S10, feature values are calculated from real world data, such as image data, which is collected in advance so as to generate learning sample data. By using this learning sample data, a transformation matrix for visualizing the feature values in an abnormality discriminant space is generated by learning. After the transformation matrix is generated, a threshold for detecting an abnormality is determined.

In abnormality sensing processing in S11, based on feature values calculated from real world data to be examined and the transformation matrix obtained from the learning processing results, normality/abnormality decision is made. If an abnormality is found, "the type of abnormality" is identified. The detection results are displayed in the abnormality discriminant space so that normality cases, abnormality cases, and different types of abnormalities can be identified visually. Detection processing is repeatedly executed every time real world data to be examined is input.

In S12, it is judged whether an instruction to finish processing is input from the operator. If the judging result is NO, the process proceeds to S11. If the judging result is YES, processing is completed.

Learning update processing in S13 involves visual checking of the judgment results obtained in S11 and learning updating by the operator. As a result of the operator starting learning update processing at a certain timing, processing, which will be discussed later, is executed in parallel with detection processing. The results of learning update processing are reflected in abnormality sensing processing in S11, thereby enhancing the decision accuracy.

Figure 3:
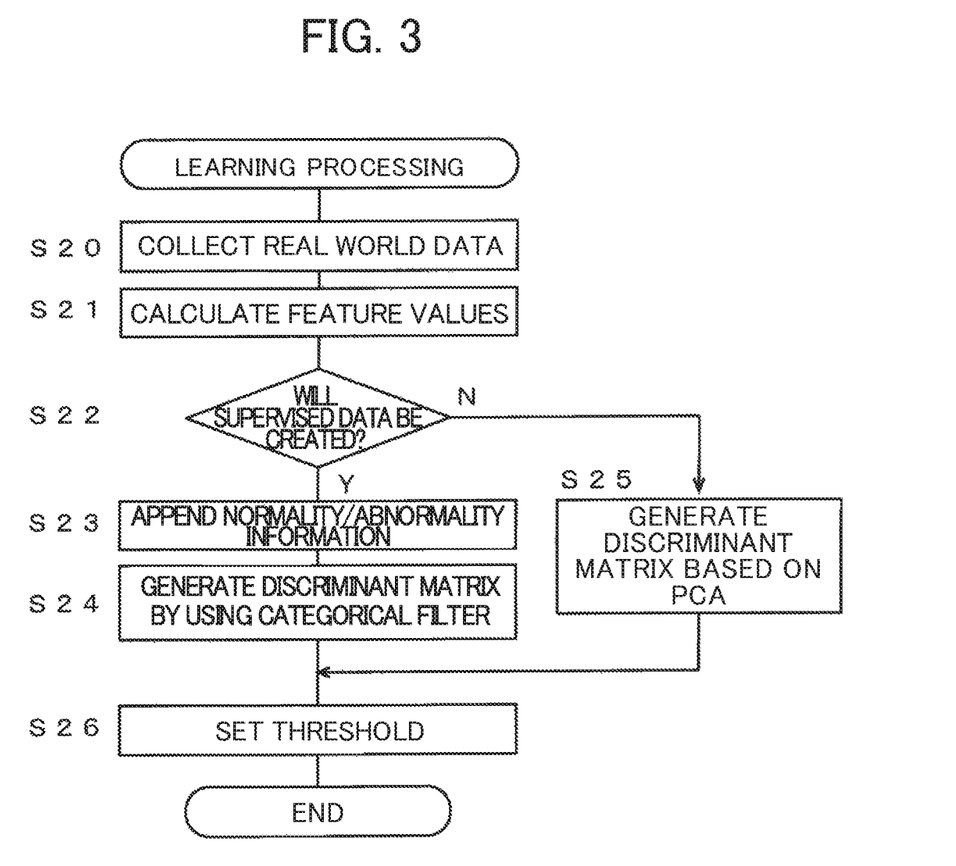
FIG. 3 is a flowchart illustrating the content of learning processing in the present invention.

FIG. 3 is a flowchart illustrating the content of learning processing in the present invention. In S20, real world data used for learning, such as image data and sound data, is collected. In S21, feature values are calculated from the collected real world data. An example of the method for calculating feature values may be the higher-order local auto-correlation feature extracting method that can calculate various versatile feature values. However, another feature value calculation method may be employed.

An example of the method for calculating higher-order auto-correlation feature values is the calculation method for a video image disclosed in PTL 1. A feature value to be calculated is expressed by the following vector in a feature space.

$$x_i \in R^m \qquad \text{[Math. 1]}$$

In the above-described expression, in the case of time-series data, such as a video image or sound, the subscript i is a subscript appended to a feature vector along the time axis which is sampled by shifting a certain time slot. In the case of non-time series data, such as a still image captured during visual checking of various products, the subscript i represents a sample number.

The superscript m represents the number of orders, such as the orders of a higher-order auto-correlation feature value to be calculated. The number of orders of the calculated feature value varies depending on the subject real world data. For example, the number of orders is 25 in the case of a two-valued still image, 35 in the case of a 256-level still image, and 251 in the case of a two-valued video image. In any of the cases, the number of orders is high.

In S22, it is judged whether to create supervised data for learning (data appended with a normality label and that appended with an abnormality label). If the judging result is NO, the process proceeds to step S25. If the judging result is YES, the process proceeds to step S23. For example, if there are only a few items of real world data and all the items are normality data, supervised data will not be created.

In S23, the operator appends a normality label or an abnormality label to all the items of collected real world data and inputs the labeled items of data. For example, in the case of visual inspection for various products, the operator labels a sample image judged as a non-defective product in visual inspection as a normal product, and a sample image judged as a defective product in visual inspection as an abnormal product. If time-series data, such as video image data and acoustic data, is subjected to processing, the operator appends an abnormality label to an item of real world data collected in a time slot in which some errors have occurred, and a normality label to the other items of real world data. Learning sample data constituted by the calculated feature values is expressed as follows.

$$D = N + A$$

$$N = \{x_i\}_{i=1}^s$$

$$A = \{x_i\}_{i=1}^t \qquad \text{[Math. 2]}$$

In the above-described expressions, N is a normality sample, and A is an abnormality sample. Typically, s>>t.

In processing of S24, a transformation matrix is calculated to project the feature values calculated from the real world data onto an abnormality discriminant space (two-dimensional plane) which the operator can visually check intuitively. Linear projection (affine mapping) of a feature vector $x_j$ is now taken as an example, assuming that coordinate vectors forming the abnormality discriminant space are a set of unit vectors $a_1$ and $a_2$. Then, projecting of the feature vector $x_j$ onto the abnormality discriminant space can be expressed by the following expressions.

$$y_j = A'x_j - b \in R^2, = [a_1, a_2] \qquad \text{[Math. 3]}$$

In the above-described expressions, vectors are all column vectors, the matrix A' is the transpose of the matrix A, and b is a translation vector. As a result of executing processing in S24, the matrix A and the translation vector b are determined from the learning sample data.

If, as in known art, abnormality samples are classified as the same group "something which is not normal", though such samples are not many, the known discriminant analysis method may be applicable to categorizing of samples into two classes, which are a normality class and an abnormality class. However, in K-class discriminant analysis, a (K−1)-dimensional discriminant space at the maximum is substantially created. In the case of two-class discriminant analysis, a linear-dimensional discriminant axis (normality versus abnormality) a_1 is substantially created.

If samples are taken along this axis and are subjected to threshold processing, an abnormality can be detected. However, a second axis may be taken in any desired manner to form an abnormality discriminant space. If a second axis is taken in a certain manner (such as an eigenvector corresponding to the second eigenvalue □_2=0, which does not contribute to discriminating between samples from each other) to form an abnormality discriminant plane, the samples are merely categorized as two clusters in which two classes, which are a normality class and an abnormality class, are separated on this plane. Different types of abnormalities are projected on the same abnormality cluster and are not distinguished from each other.

In the present invention, the use of a categorical filter is proposed as a technique for generating an abnormality discriminant plane in which normality samples are concentrated around the origin and abnormality samples are separated from the origin and dispersed from each other as far as possible so that they can be distinguished from each other. This is a technique for forming discriminant mapping by concentrating a certain class (normality class in this case) around the origin. The matrix A and the translation vector b are found by the following formulation. First of all, the average (centroid □N) of samples (N) of the normality class is mapped (translated) onto the origin of a mapping plane (y). As a result, b is found.

$$E_N(y_j) = A'E_N(x_i) - b = 0 \Rightarrow b = A'E_N(x_j) = A'\mu_N \qquad \text{[Math. 4]}$$

Then, on the condition that the variance $\sigma^2_N$ of the samples of the normality class around the origin is 1, the mapping matrix A that maximizes the variance $\sigma^2_A$ of samples (A) of the class (abnormality class in this case) other than the subject class around the origin is found. This operation is equivalent to maximizing the ratio $\lambda = \sigma^2_A / \sigma^2_N$, which results in the following variation problem using λ as a Lagrange multiplier.

$$\begin{aligned} J[A] &= \sigma^2_A - \lambda(\sigma^2_N - 1) \\ &= E_A(\|A'(x_i - \mu_N)\|^2) - \\ &\quad \lambda(E_N(\|A'(x_i - \mu_N)\|^2) - 1) \to \max \text{ for } A \end{aligned} \qquad \text{[Math. 5]}$$

Solving the above-described expressions results in the following discriminant-analysis eigenvalue problem.

$$C_A a_k = \lambda_k C_N a_k; k=1,2$$

$$C_A = E_A(x_i - \mu_N)(x_i - \mu_N)',$$

$$C_N E_N((x_j - \mu_N)(x_j - \mu_N)') \quad \text{[Math. 6]}$$

In the above-described expressions, $C_N$ is a so-called covariance matrix of the normality samples, $C_A$ is a covariance matrix (scatter matrix) of the abnormality samples around the origin. Then, $A=[a_1, a_2]$ (m×2) in which two eigenvectors corresponding to the top two largest eigenvalues $\lambda_1 \geq \lambda_2$ are arranged is determined as an optimal mapping matrix for projecting the feature values onto the abnormality discriminant space (plane).

If abnormality samples are not explicitly found during learning or if a sufficient number of abnormality samples are not prepared for learning, in S25, an abnormality discriminant plane can be generated by setting $C_A$ in mathematical expressions 6 as an identity matrix.

Alternatively, an abnormality discriminant plane may be generated based on PCA proposed in the method of the related art. For example, a normality subspace $S_N$ up to the maximum of n eigenvalues $\lambda_1 \geq \lambda_2 \geq \ldots \geq \lambda_n \geq \ldots \geq \lambda_m$ is restricted to n dimensions, and the remaining orthogonal complement space $S^\perp_N$ is set as an abnormal subspace. Then, eigenvectors corresponding to the first two eigenvalues $\lambda_{(n+1)} \geq \lambda_{(n+2)}$ in the abnormality subspace are arranged in a two-dimensional plane. This two-dimensional plane is used as an abnormality discriminant plane.

If it is difficult to collect a sufficient number of abnormality samples during learning, an abnormality may be detected in the above-described manner, and when a sufficient number of samples are accumulated, the process may proceed to processing in S23 and S24 after the detected items of data are labeled.

In S26, the value used as a threshold θ is determined. To determine the threshold θ, the distance from the origin in the discriminant space having a full rank dimension r min(m, t) in the eigenvalue problem is calculated as the value representing the degree of abnormality. This value is called the abnormality value. The false reporting rate and the non-detection rate are calculated based on the abnormality value and label information, and the threshold for making the false reporting rate be 0 and the threshold for making the non-detection rate be 0, for example, are displayed for the operator.

The thresholds may be displayed in the following manner. Sample points represented in a different mode (using different colors or shapes such as a ring, an X mark, a triangle, a square, and a cross mark) in accordance with the normality/abnormality label information are plotted on the abnormality discriminant plane. Then, a circle representing the threshold candidates is drawn on the abnormality discriminant plane.

This makes it possible to visually check which normality samples have been mistaken for an abnormality and which abnormality samples have been mistaken for normality. This also makes it possible to visually check whether the distribution trend of the normality samples that are mistaken for an abnormality is different from that of abnormality samples.

A data set different from the learning samples may be prepared and used for threshold determining processing in S26. Preparing a data set which is not used for learning can enhance the reliability of the threshold.

Figure 4:
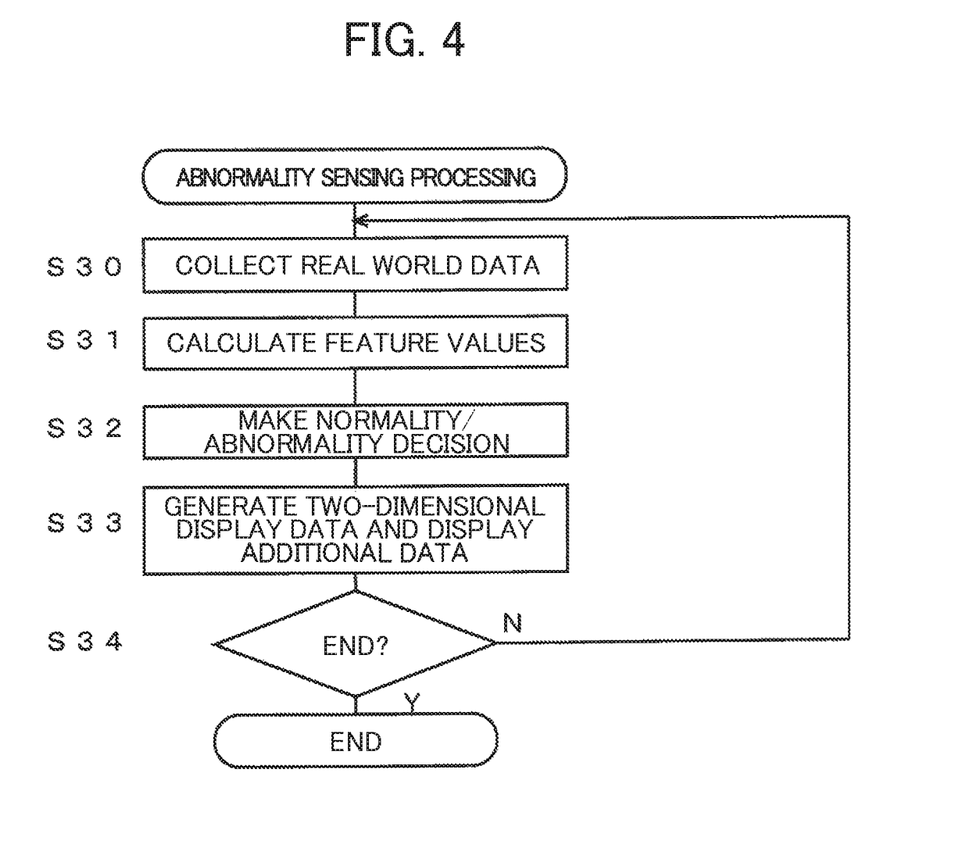
FIG. 4 is a flowchart illustrating the content of abnormality sensing processing in the present invention.

FIG. 4 is a flowchart illustrating the content of abnormality sensing processing in the present invention. In S30, real world data to be subjected to detection processing is collected. Unlike in learning processing, data collection in detection processing is performed, for example, at predetermined regular intervals. For example, the operation for collecting data for ten seconds and then executing the following detection processing on the collected data is repeatedly performed.

In S31, feature values are calculated from the collected real world data. This processing is similar to S21 in learning processing. In S32, the abnormality value is calculated by the same approach as that employed when the threshold is determined, and when the abnormality value is found to be greater than or equal to the threshold θ, it is determined that an abnormality has occurred. In processing of S33, the analysis results are plotted on the abnormality discriminant plane on which a judging circle representing the threshold θ is drawn and are displayed in real time.

Figure 6:
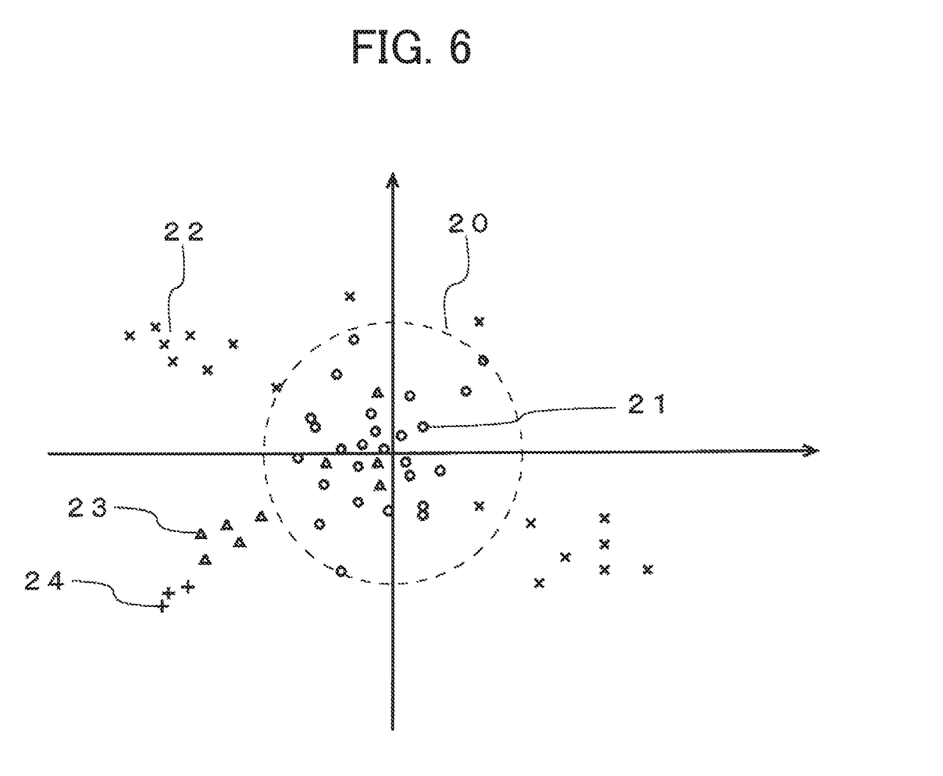
FIG. 6 is an explanatory graph illustrating a display example of an abnormality discriminant space in the present invention.

FIG. 6 is an explanatory graph illustrating a display example of a two-dimensional abnormality discriminant space (plane) in the present invention. In FIG. 6, a circle 20 represents the threshold which is set in learning processing. Normality samples and abnormality samples in the distribution of the learning real world data are respectively displayed as rings 21 and as X marks 22. Triangles 23 represent the distribution of data subjected to abnormality sensing processing (data which is not appended with a normality label nor an abnormality label by the operator). Cross marks 24 represent the distribution of data which has been analyzed most recently.

The operator can intuitively understand the difference between normality data and abnormality data by visually checking the distribution, such as that shown in FIG. 6. Additionally, the distribution (such as cross marks 24) deviating (separating) by a certain degree or more from the distribution of abnormality samples (X marks 22) prepared during learning are judged as possibly unknown abnormalities and are presented to the operator. This enables the operator to examine the real world data by handling such unknown abnormalities in a certain manner, which will be discussed later. In S34, it is judged whether an instruction to finish processing is provided. If the judging result is NO, the process proceeds to S30. If the judging result is YES, processing is completed.

Figure 5:
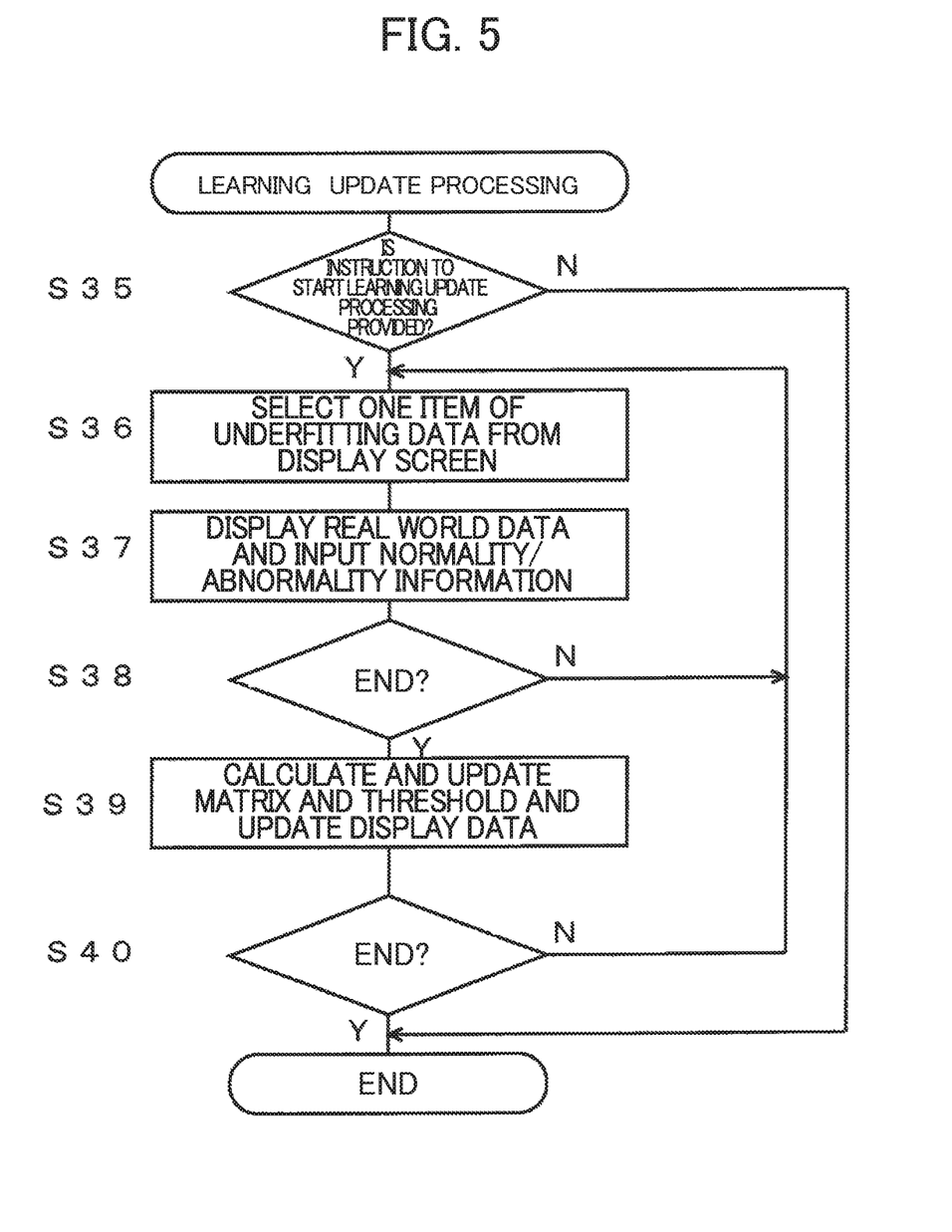
FIG. 5 is a flowchart illustrating the content of learning update processing in the present invention.

FIG. 5 is a flowchart illustrating the content of learning update processing in the present invention. In S35, it is judged whether an instruction to start learning update processing is provided from the operator. If the judging result is NO, processing is terminated. If the judging result is YES, the process proceeds to S36. In S36, the operator is instructed to select one item of underfitting data from the display screen. Underfitting data is data which is not appended with a normality label nor an abnormality label by the operator.

In S37, real world data, such as a video image, a still image, or sound, is displayed for the operator, and the operator views (hears) this real world data and judges whether it is normal or abnormal and inputs the judgement result into the computer 11. In S38, it is judged whether an instruction to finish determination processing is provided from the operator. If the judging result is NO, the process proceeds to S36. If the judging result is YES, the process proceeds to S39.

In S39, the matrix and the threshold used to judge the presence or the absence of an abnormality in abnormality judging processing are recalculated and updated. Then, display data to be presented to the operator is also updated.

In S40, it is judged whether an instruction to finish learning update processing is provided. If the judging result is NO, the process proceeds to S36. If the judging result is YES, processing is completed.

As a result of the operator examining data, if the data is found to be a true unknown abnormality, it is appended with a normality label or an abnormality label based on an instruction from the operator and is added to the supervised data. Then, learning processing is re-executed, and the unknown abnormality can be treated as a known abnormality.

In abnormality detection, false reporting may occur in which a detected abnormal phenomenon is actually a normal phenomenon. In S37, if a judgement result obtained by the program is false, a false report flag is appended to the detection result.

In S37, it is checked whether an abnormality detected by the operator is a known abnormality or an unknown abnormality. If the abnormality is found to be an unknown abnormality, the content of the abnormality is input and a new class concerning this abnormality is created.

For the operator to perform the above-described operation, when the device presents the abnormality discriminant plane to the operator, it also presents information concerning various analysis results. This enables the operator to understand the detection results more intuitively. The optimal approach to presenting the abnormality discriminant plane and information varies depending on whether or not the input real world data is time-series data.

Figure 8:
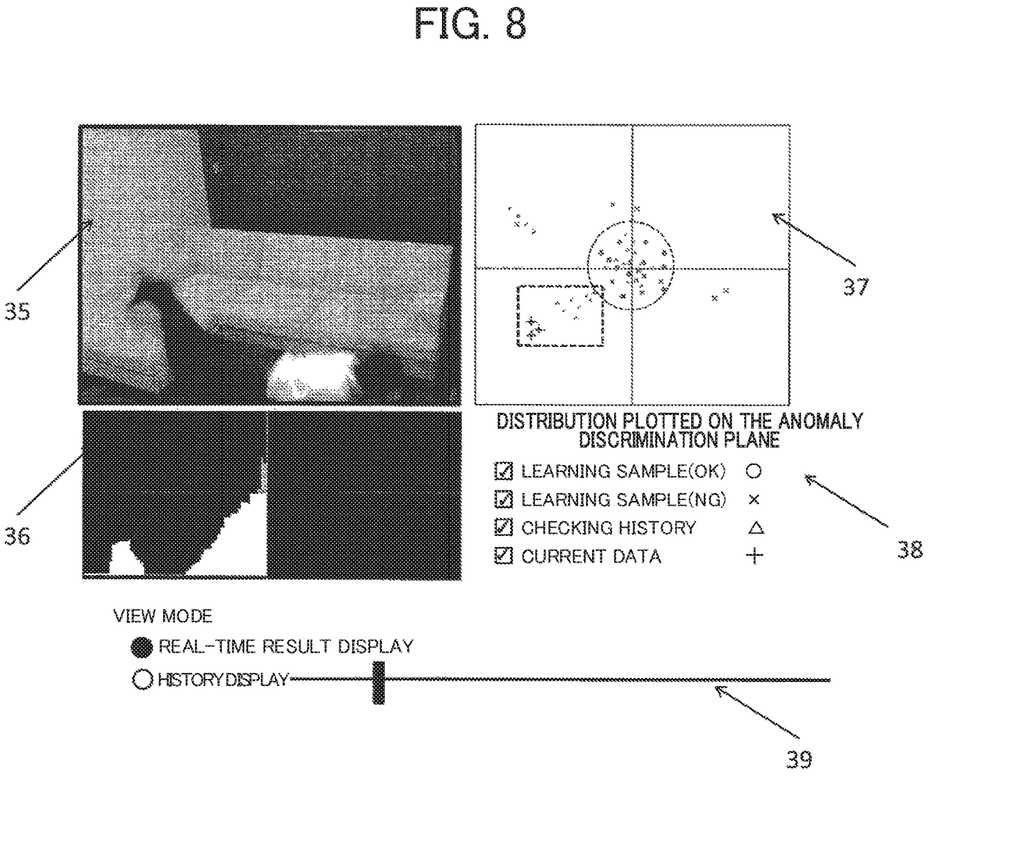
FIG. 8 is an explanatory view illustrating an example of the display screen of an abnormality discriminant space when video image analyzing is conducted in the present invention.

FIG. 8 is an explanatory view illustrating an example of the display screen of an abnormality discriminant space when video image analyzing is conducted in the present invention. The configuration shown in FIG. 8, for example, may be used to display time-series data, such as video images. Images, such as an input video image 35, are sequentially displayed on the top left of the screen, and when an abnormality is detected, a warning is given by means of highlighting the edges of the video image in color or issuing alarm sound. If the input real world data is time-series signal data, such as sound, the waveforms of each signal data to be analyzed may be displayed.

The transition 36 of the abnormality value to be subjected to threshold processing and a set threshold are displayed on the bottom left of the screen. When the transition of the abnormality value has reached the area exceeding the threshold, information that an abnormality has occurred as a result of executing threshold processing is displayed. The distribution 37 on the abnormality discriminant plane shown in FIG. 6 is displayed on the top right of the screen.

Providing an interface for selecting a feature point plotted on the abnormality discriminant plane with a mouse enables the operator to easily and simply perform visual checking. Additionally, visual checking information is displayed on the screen as indicated by the rectangle in the drawing, thereby enabling the operator to understand the detection results more intuitively.

Checking the boxes in a list 38 allows the operator to display items of distribution information only that the operator wishes to check. The operator is also able to select whether stored analysis results or real-time processed analysis results are displayed. If the stored analysis results are displayed, the operator selects the date on which analysis results to be displayed were obtained with a slide bar 39. An interface, such as a calendar format, may alternatively be used to select the date. Buttons for displaying results in slow playback or reverse playback may also be provided.

Figure 9:
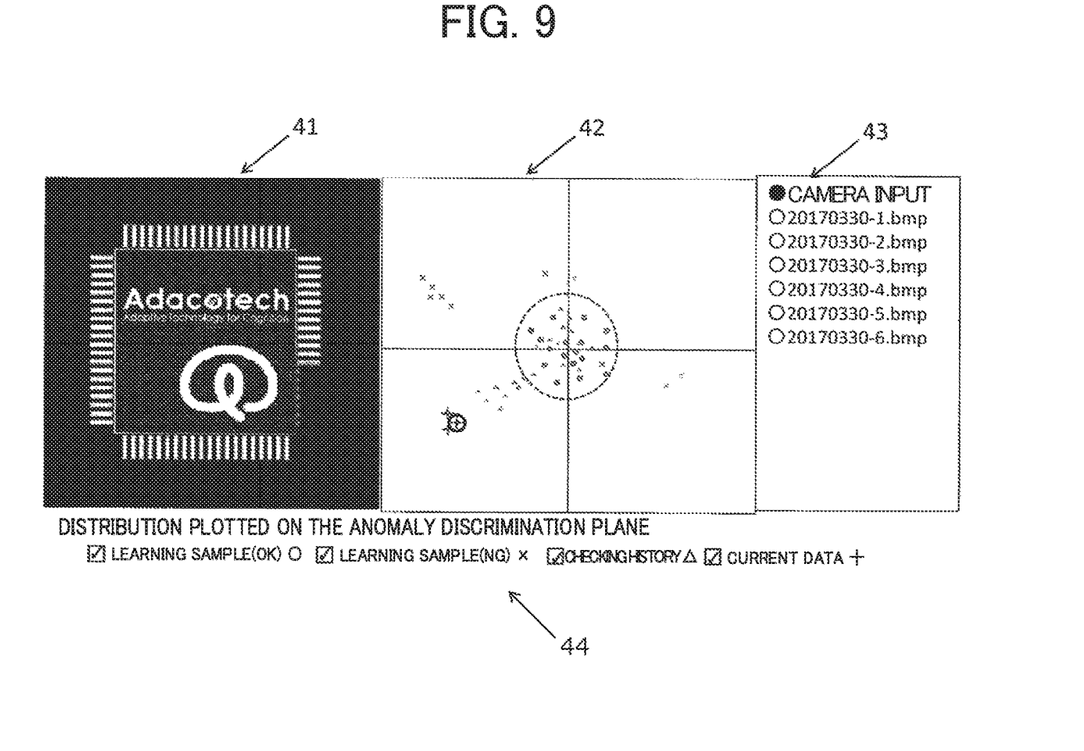
FIG. 9 is an explanatory view illustrating an example of the display screen of an abnormality discriminant space when visual checking using a still image is conducted in the present invention.

FIG. 9 is an explanatory view illustrating an example of the display screen of an abnormality discriminant space when visual checking using a still image is conducted in the present invention. In visual checking, it is necessary to specify which portion of an input still image has a defect. Then, the input still image is divided into partial regions, and the extracting of feature values and the detecting of an abnormality is conducted in each partial region.

In FIG. 9, an image 41 subjected to checking and checking results 41 are displayed on the left side of the screen. As checking result information, the magnitude of the abnormality value and the normality/abnormality decision results are displayed. Portions having a large abnormality value (white, small squares at the bottom right of the image in FIG. 9) are displayed by changing the color of the portions.

Instead of displaying the abnormal portions in the above-described manner, the abnormal portions may be displayed with gradations in accordance with the magnitude of the abnormality value. The center of the screen shows a feature distribution diagram 42 on the abnormality discriminant plane. The feature distribution diagram 42 is displayed as a result of selecting one or multiple sample images to be displayed from a list 43. The rings in the feature distribution diagram 42 represent the feature samples of the image (or images) selected by the operator.

As a result of the operator performing the above-described operation, a subject image is displayed in the area 41 of the left side of the screen, and a rectangle is displayed in the corresponding portion of the feature distribution diagram 42. The list 43 on the right side of the screen is used for the operator to select whether stored analysis results or real-time processed analysis results are displayed. In the case of displaying real-time processed analysis results, images are captured in response to an external signal as a trigger, and checking processing is executed. In addition to the information shown in FIGS. 8 and 9, the ongoing progress status before analysis results are obtained, such as a postprocess applied image, may be displayed on the screen.

Displaying the above-described information makes it possible to visually and easily identify different types of abnormalities, as well as to make normality/abnormality decision. Additionally, unlike two-class discriminant analysis, different types of abnormalities are highly likely to be located at different positions on the abnormality discriminant plane. It is thus possible to present different types of abnormalities to the operator visually and intuitively.

Second Embodiment

In the first embodiment, real world data for learning is expressed as two classes, which are a normality class and an abnormality class. In some cases, abnormalities may be defined as multiple classes. For example, in video image monitoring, abnormality classes can be defined in greater details, such as "trespassing on the premises", "fighting", and "falling off". In this case, normality cases can be treated as one class and be applied to regular multi-class discriminant analysis. Normality cases may also be categorized as multiple classes. If multi-class (K-class) discriminant analysis is conducted, S24 in FIG. 3 is implemented by solving the following eigenvalue problem.

$$C_B a_k = \lambda_k C_W a_k;$$

$$C_B = \Sigma_{j=1}^K \omega_j (\mu_j - \mu_T)(\mu_j - \mu_T)',$$

$$C_W = \Sigma_{j=1}^K \omega_j C_j \qquad \text{[Math. 7]}$$

In the above-described expressions, the intra-class covariance matrix of a feature vector is represented by $C_W$, while the inter-covariance matrix of a feature vector is represented by $C_B$. $\mu_j$ is the average feature vector of a class j, $\mu_T$ is the overall average vector of the average feature vectors, $\omega_j$ is the prior probability of the class j ($\Sigma_j \omega=1$), and $C_j$ is the covariance matrix of the class j.

In the n=min(m, K−1)-dimensional discriminant space, the distance between an input feature vector and each class (the Euclidean distance or Mahalanobis distance between the input feature vector and the centroid of each class) is calculated, thereby making it possible to identify the class having the smallest distance. That is, it is possible to make normality/abnormality decision and, if an abnormality is found, the type of abnormality is also identified.

If emphasis is not much placed on identifying of the type of abnormality, a categorical filter may be used to enhance the accuracy of abnormality detection. In this case, S24 in FIG. 3 is implemented by solving the eigenvalue problem represented by the following mathematical expressions. In the following expressions, $\mu_N$ is the average feature vector of a normality class.

$$C_B a_k = \lambda_k C_W a_k;$$

$$C_B = \Sigma_{j=1}^{K} \omega_j (\mu_j - \mu_N)(\mu_j - \mu_N)',$$

$$C_W = \Sigma_{j=1}^{K} \omega_j C_j \qquad [\text{Math. 8}]$$

In the above-described method, however, an unknown phenomenon that is not supposed to be categorized as one of the learned K classes is identified as one of the learned classes. To avoid such a situation, if the centroid distance to the identified class is found to be greater than or equal to the threshold θ, such an input feature vector is treated as an "unknown abnormality".

The threshold is determined in processing in S26. As the approach to determining the threshold, the threshold $\theta_i$ is calculated for each class. In S26, for each class, the average $\mu_i$ of the centroid distances to learning samples and the standard deviation $\sigma_i$ are calculated, and the threshold $\sigma_i$ is calculated according to the following expression (a certain value is set as n).

$$\theta_i = \mu_i + n\sigma_i \qquad [\text{Math. 9}]$$

Basically, displaying of the distribution in the abnormality discriminant space (plane) in S33 is similar to the first embodiment. In the second embodiment, a distribution region is displayed for each class based on $\theta_i$. That is, as in the first embodiment, learning real world data appended with the normality label and a circle, which is a distribution region found based on the threshold for the normality class, are displayed. Moreover, in addition to learning real world data appended with abnormality labels for a group of individual abnormality classes, the distribution regions each represented by a circle having the centroid of the distribution at the center are displayed. Displaying the learning real world data and the circles in this manner makes it possible to easily identify whether the most recent data represents an unknown phenomenon which is not categorized as a known phenomenon, for example.

While the embodiments have been discussed as described above, the following modified example may alternatively be made in the present invention. In the embodiments, the abnormality discriminant space is two-dimensionally displayed for the operator by way of example. Alternatively, the abnormality discriminant space may be displayed three-dimensionally. A display device can display the abnormality discriminant space only two-dimensionally. The operator thus performs a certain operation, such as rotating the display space in a certain direction, so as to recognize the position of each data in the space.

INDUSTRIAL APPLICABILITY

The present invention is applicable to recognizing and identifying a certain signal that can be input into a computer and detecting an abnormality from the signal.

EXPLANATION OF REFERENCE NUMERALS camera, 11 computer, 12 monitor, 13 keyboard, 14 mouse

The invention claimed is:

1. An abnormality detection device comprising:
a display; and
a computer which executes a program to control the abnormality detection device to perform processes including:
calculating high-dimensional feature values from real world data;
projecting, by using a matrix generated from real world data collected for learning, the feature values calculated from the real world data which is input for inspection onto an abnormality discriminant space, the abnormality discriminant space being used for determining presence or absence of an abnormality, wherein:
the abnormality discriminant space is a space in which real world data samples of a normality class are concentrated around an origin of the abnormality discriminant space, and real world data samples of an abnormality class are separated from other abnormality samples; and
samples of the real world data collected for learning are categorized according to a plurality of classes which include the normality class and multiple abnormality classes, each abnormality class being associated with a respective type of content of real world data;
judging the presence or absence of an abnormality from a distribution of the feature values projected in the abnormality discriminant space;
identifying, if an abnormality is found and if the abnormality is a known abnormality, content and a type of the abnormality from a trend in the distribution of the feature values in the abnormality discriminant space and presenting the content of the abnormality, wherein abnormalities of different types of content are associated with different positions in the abnormality discriminant space; and
visually displaying, on the display, a result of finding an abnormality in feature distribution in the abnormality discriminant space.

2. The abnormality detection device according to claim 1, wherein the computer controls the abnormality detection device to update the matrix by executing learning processing based on the displayed detection result.

3. The abnormality detection device according to claim 1, wherein the matrix is generated by using a categorical filter which generates said abnormality discriminant space by:
determining a translation vector which maps a centroid of samples of the normality class onto the origin, and determining the matrix as a mapping matrix that maximizes a variance $\sigma^2 A$ of samples of an abnormality class other than the normality class around the origin, on a condition that the variance $\sigma^2 N$ of the samples of the normality class around the origin is 1.

4. An abnormality detection method comprising:

calculating high-dimensional feature values from real world data;

projecting, by using a matrix generated from real world data collected for learning, the feature values calculated from the real world data which is input for inspection onto an abnormality discriminant space, the abnormality discriminant space being used for determining presence or absence of an abnormality, wherein:

the abnormality discriminant space is a space in which real world data samples of a normality class are concentrated around an origin of the abnormality discriminant space, and real world data samples of an abnormality class are separated from the origin by a maximum amount so as to be distinguished from the normality samples; and samples of the real world data collected for learning are categorized according to a plurality of classes which include the normality class and multiple abnormality classes, each abnormality class being associated with a respective type of content of real world data;

judging the presence or absence of an abnormality from a distribution of the feature values projected in the abnormality discriminant space;

identifying, if an abnormality is found and if the abnormality is a known abnormality, content and a type of the abnormality from a trend in the distribution of the feature values in the abnormality discriminant space and presenting the content of the abnormality, wherein abnormalities of different types of content are associated with different positions in the abnormality discriminant space; and visually displaying a result of finding an abnormality in feature distribution in the abnormality discriminant space.

5. A non-transitory computer readable storage medium having stored therein a program that is executable by a computer to perform functions comprising:

calculating high-dimensional feature values from real world data;

projecting, by using a matrix generated from real world data collected for learning, the feature values calculated from the real world data which is input for inspection onto an abnormality discriminant space, the abnormality discriminant space being used for determining presence or absence of an abnormality, wherein:

the abnormality discriminant space is a space in which real world data samples of a normality class are concentrated around an origin of the abnormality discriminant space, and real world data samples of an abnormality class are separated from the origin by a maximum amount so as to be distinguished from the normality samples;

samples of the real world data collected for learning are categorized according to a plurality of classes which include the normality class and multiple abnormality classes, each abnormality class being associated with a respective type of content of real world data;

judging the presence or absence of an abnormality from a distribution of the feature values projected in the abnormality discriminant space;

identifying, if an abnormality is found and if the abnormality is a known abnormality, content and a type of the abnormality from a trend in the distribution of the feature values in the abnormality discriminant space and presenting the content of the abnormality, wherein abnormalities of different types of content are associated with different positions in the abnormality discriminant space; and visually displaying a result of finding an abnormality in feature distribution in the abnormality discriminant space.

* * * * *